Dec. 26, 1950     C. E. IVES     2,535,928
CHERRY PITTER
Filed Aug. 7, 1948     4 Sheets-Sheet 1
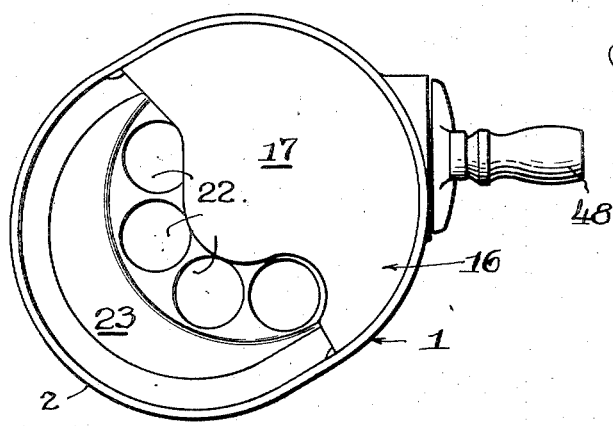
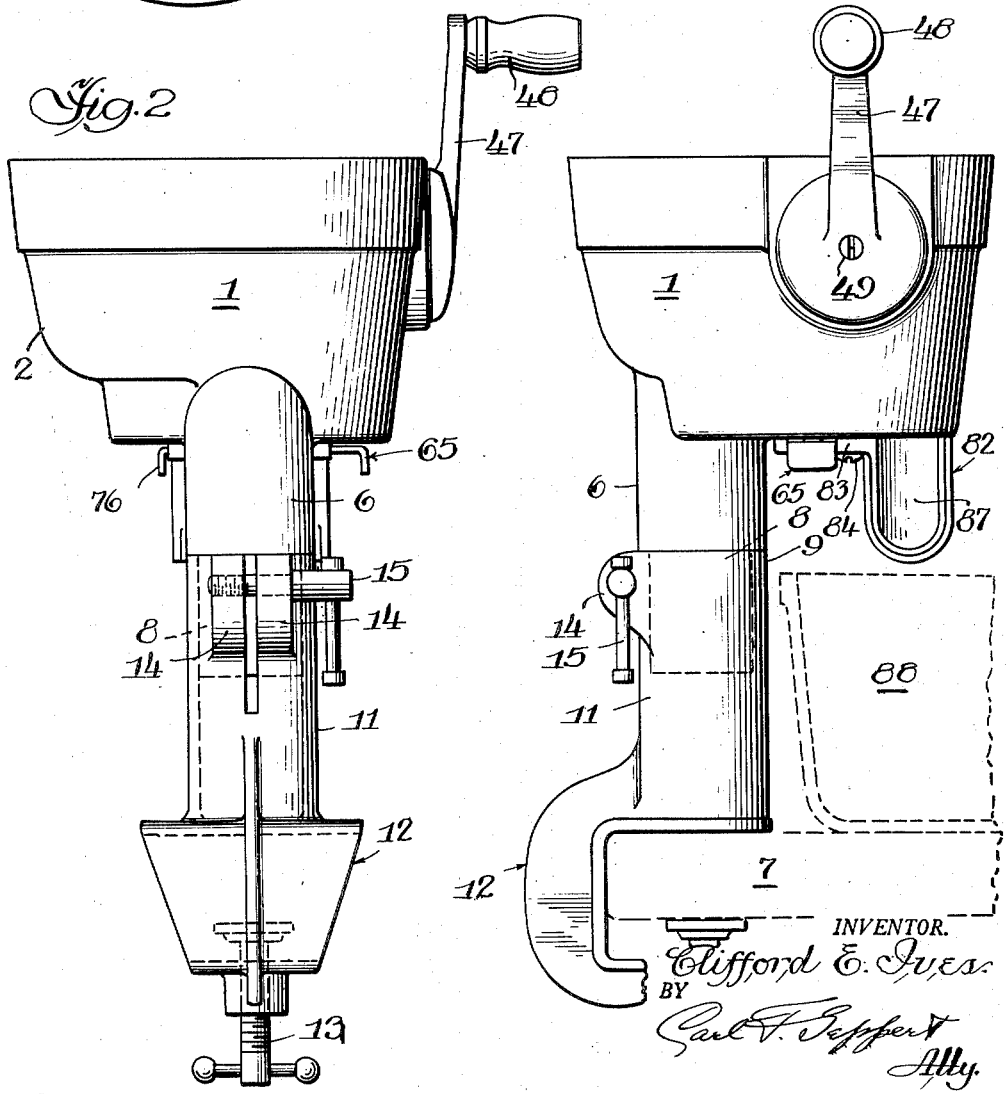
INVENTOR.
Clifford E. Ives
BY
Carl F. Geppert
Atty.

Dec. 26, 1950   C. E. IVES   2,535,928
CHERRY PITTER
Filed Aug. 7, 1948   4 Sheets-Sheet 2

INVENTOR.
Clifford E. Ives
BY Carl F. Zipperer
Atty

Dec. 26, 1950   C. E. IVES   2,535,928
CHERRY PITTER

Filed Aug. 7, 1948   4 Sheets-Sheet 3

INVENTOR.
Clifford E. Ives.
BY
Carl F. Eppert
Atty.

Dec. 26, 1950      C. E. IVES      2,535,928
CHERRY PITTER
Filed Aug. 7, 1948      4 Sheets—Sheet 4
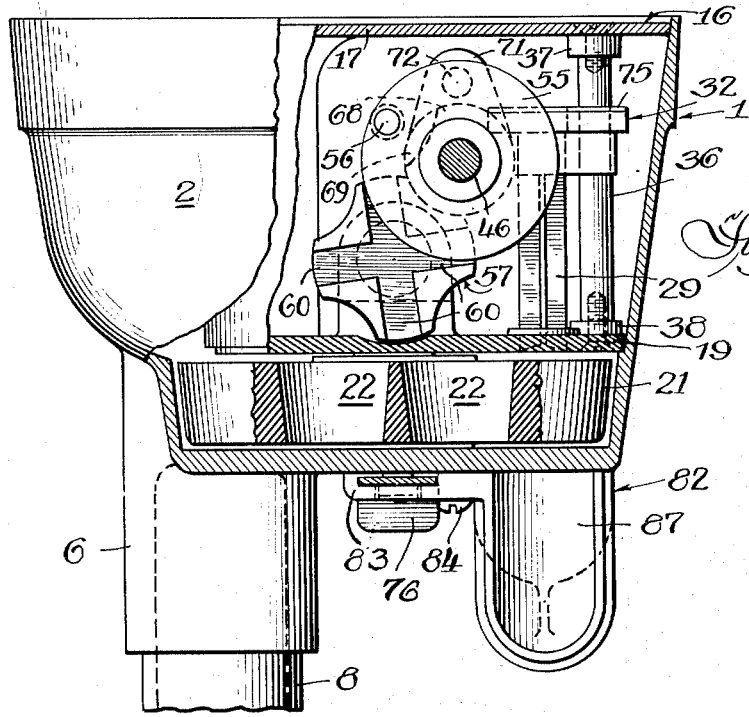
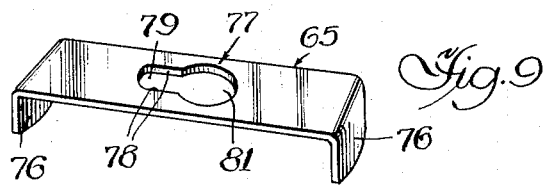
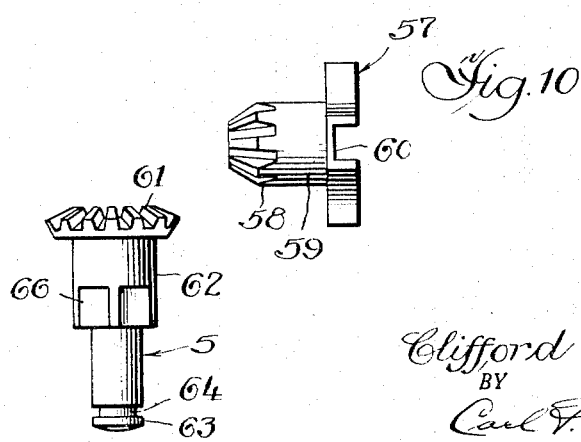
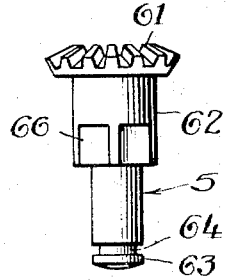
INVENTOR.
Clifford E. Ives.
BY
Carl V. Eppert
Atty.

Patented Dec. 26, 1950

2,535,928

UNITED STATES PATENT OFFICE 2,535,928

CHERRY PITTER

Clifford E. Ives, Wilmette, Ill., assignor to Sears, Roebuck and Co., Chicago, Ill., a corporation of New York Application August 7, 1948, Serial No. 43,076

1 Claim. (Cl. 146—19)

The present invention relates to a cherry pitter and more particularly to a novel construction and to a novel means and mechanism for the successive pitting and ejection or discharge of the pitted cherries.

Among the objects of the present invention is the provision of a novel means and mechanism for pitting cherries and including a recesesed conveyor for receiving and successively feeding individual cherries through an intermittent and progressive cycle of movement in which successive cherries are conveyed into the path of a punch holder having simultaneously operated multiple punches, one for removing the pit of one cherry and another for simultaneously and forcibly ejecting or discharging another cherry previously pitted.

The present invention further comprehends a novel operating mechanism for a cherry pitter and including a Geneva movement for translating a continuous rotation of the drive shaft into an intermittent and progressive arcuate movement of a wheel-like conveyor for receiving and presenting individual cherries in position for the pitting operation and subsequent ejection of the pitted cherry, and for also and simultaneously translating such continuous rotation of the drive shaft into an intermittent reciprocating movement of a punch holder for pitting a cherry and forcibly ejecting a cherry pitted in a preceding operation. To accomplish this dual operation of the punch holder, it is provided with a bladed punch for removing the pit from the cherry, and another punch for successively ejecting or removing the pitted cherry from its conveyor.

Another important object of the present invention is the provision of a cherry pitter composed of a novel assembly of parts so constructed, arranged and related that they may be quickly and easily assembled for operation or disassembled for cleaning or replacement of any of the parts. To facilitate such ready assembly or disassembly and to positively retain the parts in assembled relation, the invention comprehends an outer casing or housing, an inner casing or housing embodying the drive or operating mechanism and conformably received within the outer casing, a conveyor wheel or disc provided with a plurality of recesses disposed in spaced relation about its periphery, and a locking key for locking the parts in assembled relation.

Another important object of the present invention is the provision in a cherry pitter of a novel punch assembly comprising a reciprocating punch holder spring-biased into elevated or inoperative position and provided with a pair of punches, one comprising crossed blades for piercing the cherry and removing the pit, and the other comprising a tubular member for forcibly ejecting the cherry from the recess in which it is conveyed to the punch holder after the pit has been removed.

The present invention further relates to cherry pitters of the portable type adapted primarily for home use, and a novel operating mechanism for a cherry pitter which is so designed, constructed and operated as to cleanly remove the pits and discharge the pitted cherries with a minimum of damage thereto.

A further object of the present invention is the provision of a cherry pitter that may be operated manually or to which a motor may be applied for operating the drive shaft. This is quickly accomplished by removal of the hand crank and the mounting of a standard motor upon the standardized flange mounting on the outer casing of the cherry pitter assembly. The standardly mounted motor is adapted to drive the present cherry pitter as well as other portable devices of my construpction. The present invention further comprehends the provision of a standardized base clamp which is adapted to mount the present cherry pitter upon the edge of a table or other support and also to mount and support other kitchen or portable devices primarily adapted for home use.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangements of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a top plan view of the novel assembly of cherry pitter.

Fig. 2 is a view in front or end elevation thereof.

Fig. 3 is a view in side elevation of the novel cherry pitter.

Fig. 8 is a view, part in side elevation and part in vertical cross section, the view being taken in a plane represented by the line 8—8 of Fig. 5.

Fig. 9 is a view in perspective of the lock for maintaining the assembly of the parts and which permits the removal of the entire mechanism from the bowl or housing to permit cleaning and washing of the bowl and dial or conveyor.

Fig. 10 is a view in elevation of the combined bevel gear or pinion and the Geneva gear for actuating the drive shaft.

Fig. 11 is a view in elevation of the combined bevel gear or pinion and vertical shaft for operating the conveyor or dial.

Figures 4, 5:
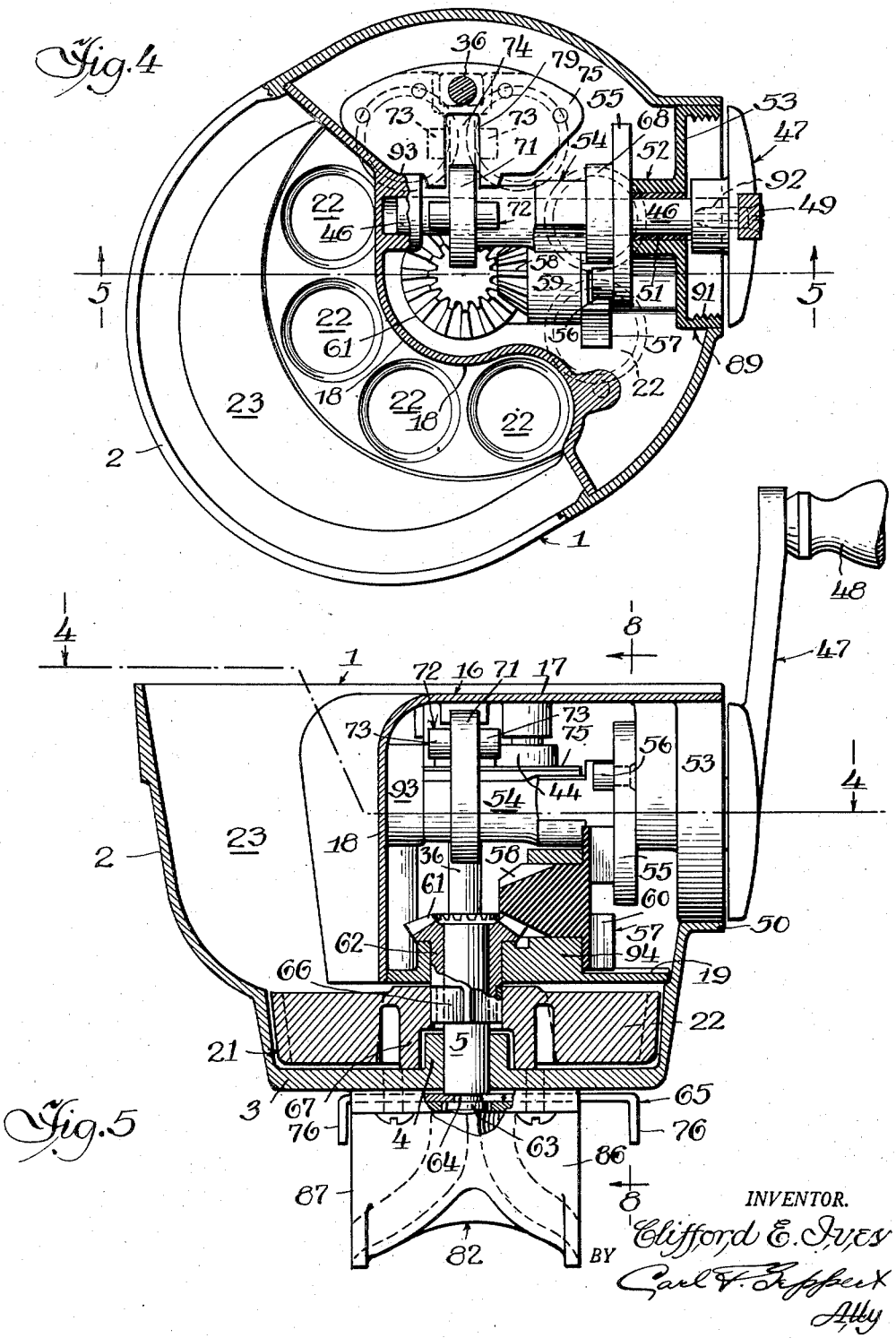
Fig. 4 is an enlarged view in horizontal cross section taken on the irregular line 4—4 of Fig. 5.
Fig. 5 is a view in vertical cross section taken in a plane represented by the line 5—5 of Fig. 4.

Referring more particularly to the novel cherry pitter of the present invention there is disclosed a principal housing member or bowl component formed to provide a hopper for receiving the cherries and a housing in which is located novel operating mechanism for pitting and discharging the pits and pitted cherries so that all that is required is for the operator to introduce cherries to the hopper in the casing or bowl with one hand and with the other hand turn the handle which actuates an apertured disk or cylinder for automatically conveying the cherries to the pitting operation and simultaneously actuates the pitting mechanism for successively pitting and discharging the pitted cherries conveyed thereto by the disc. The cherry pitter assembly comprises an outer casing or bowl-shaped housing 1 with a downwardly and inwardly tapered side wall 2 merging into a substantially cylindrical base 3 (Fig. 5) provided with an upstanding and centrally disposed bearing 4 for a vertical drive shaft 5. The side wall also merges into a depending tubular extension 6 (Figs. 2 and 3) for mounting the pitter upon a table or other support 7. This tubular extension is provided with a reduced neck 8 adapted to be removably received within a socket 9 formed or provided at the upper end of a pedestal 11 on a base clamp 12, the latter being retained in desired position by a threaded clamping screw or the like 13. In order to lock the reduced neck 8 in the socket 9 and prevent the pitter from rotating relative to the base clamp 12 and support, the socket is longitudinally slit and provided adjacent the slit with integral, spaced lugs or projections 14 receiving therebetween an adjustable clamping screw 15.

Figure 6:
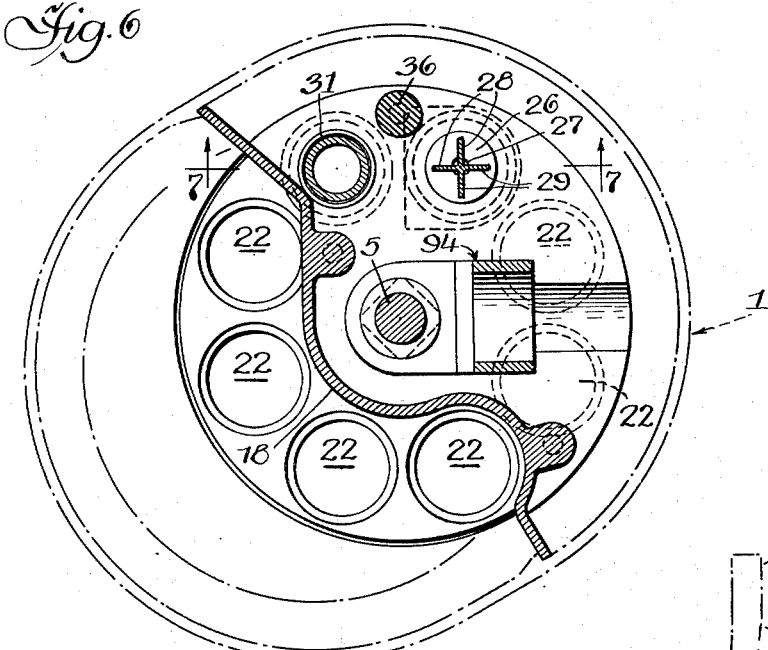
Fig. 6 is a view in horizontal cross section taken in a plane represented by the line 6—6 of Fig. 7, and showing in dotted outline the outer housing or bowl.
Figure 7:
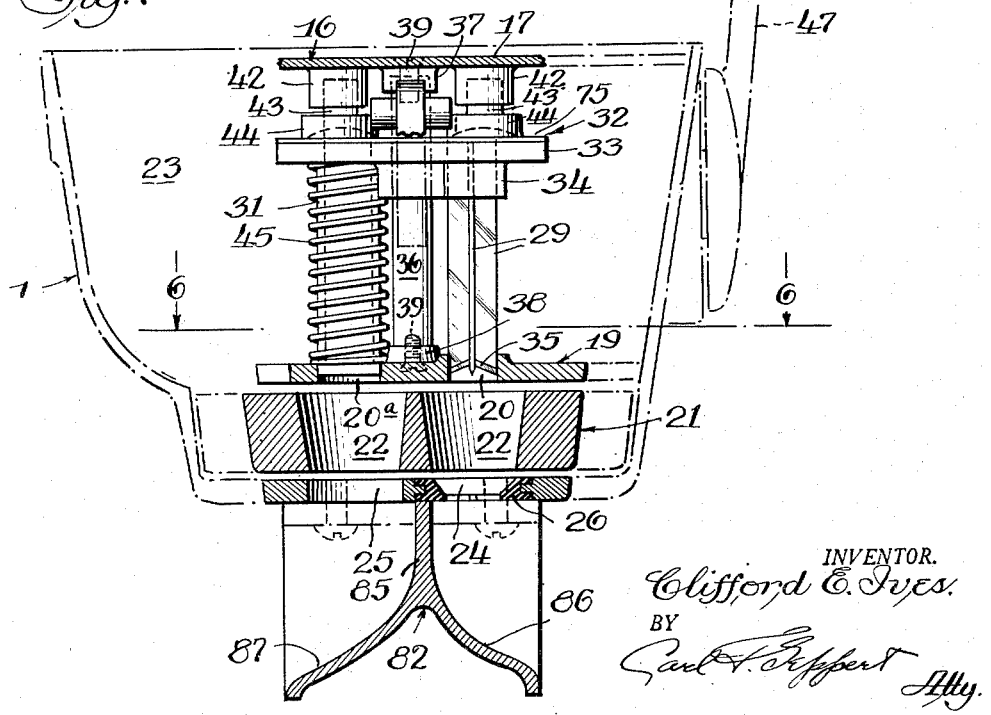
Fig. 7 is a view in vertical cross section taken in a plane represented by the line 7—7 of Fig. 6, and also showing in dotted outline the bowl or outer casing with the manual operating mechanism.

Within the principal casing or housing 1 is removably mounted an inner or secondary casing 16 carrying the operating or actuating mechanism and formed or provided with a top plate 17, a side wall 18 and a removable bottom plate 19 having spaced openings 20 and 20ᵃ therein, Fig. 7. Positioned and conformably received between the bottom plate 19 and the cylindrical base 3 is a rotatable conveyor disc or plate 21 having a plurality of relatively closely spaced and downwardly tapered recesses 22 each adapted to receive a single cherry from the space or chamber thereabove forming a hopper 23. The conveyor plate 21 is rotated in such manner (Figs. 6 and 7) that each recess successively aligns with an opening 24 for the removal of its pit and thereafter with an opening 25 through which it is discharged.

The opening 24 is lined with a resilient diaphragm or membrane 26 of rubber-like material having a reduced central recess 27 of intersecting slots 28 for the passage therethrough of the cherry pits and of crossed punch blades 29 which remove the pit from the cherries. These blades are aligned with and movable through the opening 20 in the base plate 19. The opening 25 is of such size that the pitted cherries may be discharged therethrough by a plunger. To accomplish this discharge subsequent to the pitting operation, there is provided a plunger 31 aligned with and movable through the opening 20ᵃ in the base plate 19 of the inner casing 16.

The punch blades 29 and plunger 31 are carried by and depend from a holder 32 operable within the inner casing 16 and comprising a plate or crosshead 33 having a depending annular flange or protuberance 34 for receiving and rigidly mounting the upper ends of the blades 29. These blades are longitudinally slotted for interlocking engagement and assembly and with the cutting ends 35 of these blades outwardly inclined and tapered to provide a sharp cutting edge which readily pierces each cherry and upon contacting the pit, forces this pit downwardly through the central recess 27 of the diaphragm 26 with the blades 29 emerging through the radial slots 28 aligned therewith.

The punch holder is directed in its vertical movement by a guide shaft 36 having its upper end secured at 37 to the top plate 17 and its lower end secured at 38 to the bottom plate 19 and affixed to these plates by screws or other securing means 39. Depending from the top plate 17 and at the opposite sides of the leader pin 36 there is provided a pair of spaced bosses 42, 42, each adapted to receive and retain the stem or shank 43 carrying a depending resilient buffer made of rubber or other resilient material 44. These resilient buffers are disposed in the path of the punch holder 32 to provide shock pads therefor as it is returned to its elevated position by a coil spring 45 encompassing the plunger 31 and held between the lower surface of the top plate 33 on the punch holder 32 and the base or bottom plate 19 of the inner casing 16.

As more clearly shown in Figs. 4 and 5, to actuate the punch holder whereby to pit and discharge the cherries, and simultaneously and synchronously therewith to rotate the conveyor disc or dial 21 to supply cherries for the pitting operation, there is provided a drive or actuator shaft 46 rotated by means of a crank arm 47 and a handle 48 suitably affixed to but detachable from the shaft by a screw or the like 49, the end of the drive shaft adjacent the crank arm being journalled in the bushing 51 and bearing 52 formed on an annular member 53 depending from the upper plate 17. When assembled the annular member 53 seats within the flange 50 of the bowl or outer casing 2. Pinned or keyed to this shaft is an actuator comprising an elongated sleeve-like member 54 formed or provided with a plate or disc 55 carrying a Geneva drive pin 56 for engaging and successively and intermittently rotating a Geneva gear 57 formed integral with or carrying a pinion or bevel gear 58 at the end of its hub or shank 59 (Fig. 10). The actuating or drive face of the Geneva gear 57 is provided with a plurality of radial slots 60.

Thus during each revolution of the actuator shaft 46, the drive pin 56 carried by the disc 55 engages in one of the slots 60 and moves the Geneva gear through one step or cycle of movement. As in the disclosed embodiment the Geneva gear is provided with four radial slots, it follows that this gear is intermittently and progressively moved through one-fourth of a revolution or through an arc of 90° for each revolution of the actuator shaft. This movement is transmitted to the pinion 58 in mesh with a bevel gear 61 on the vertical drive shaft 5 and through the ratio of the teeth of these bevel gears each cycle or one-fourth revolution of the Geneva gear 57 and its pinion 58 causes the bevel gear 61 to rotate through one-eighth of a revolution or through an arc of 45°.

The pinion or bevel gear 61 has its hub 62 press fitted or otherwise secured onto the upper end of the vertical drive shaft 5 journalled in the bearing 4 and is provided adjacent its lower end 63 where it projects through the bearing 4 and base 3 with an annular slot 64 for the reception of a lock 65 for locking the conveyor or disc 21, drive shaft 5 and inner casing 16 in operative and assembled relation in the outer casing or bowl-shaped housing 1. In order that the shaft 63 rotates the disc 21, the hub 62 is formed with a squared or polygonal portion 66 received in a complementary opening in the depending hub 67 of the conveyor disc.

Provided on the actuator sleeve 54 adjacent the disc or plate 55 is a collar 68 having a segment or portion 69 removed to assure proper actuation or operation of the Geneva gear 57. Also provided on the shaft is an eccentric 71 carrying adjacent its outer end a punch actuator pin 72 extending through the eccentric to provide a projection 73 at each side thereof. To permit this eccentric to rotate with the actuator sleeve 54 and to clear the punch holder 32, the punch holder is slotted at 74 whereby the opposite ends 73 of the actuator pin 72 engage the upper surface of the punch holder and depress it against the compression of the coil spring 45. To eliminate wear due to such engagement, a wear plate 75 is affixed to the top of the punch holder.

The lock 65 plate is a strap steel member bent at each end as at 76 and having in its body a keyhole slot 77 for receiving the end of shaft 5 whereby movement to the right as viewed in Fig. 9, causes the edges 78 thereof to seat within the annular slot 64. To disassemble and remove the entire mechanism from the outer housing or bowl, all that is required is to move the lock strap 65 to the left as viewed in Fig. 9 so that the enlarged opening 81 of the key-hole slot 77 is aligned with the vertical shaft 63, whereupon the inner casing 16 and its operating mechanism including the disc 21 may be lifted bodily.

Disposed beneath the outer housing or bowl-like casing 1 is a chute casting 82 having a securing flange 83 fastened to the base 3 by screws or other attachment means 84. This chute assembly is provided with a dividing wall 85 downwardly and outwardly inclined to provide a chute 86 for the cherry pits discharging at one side thereof, and a chute 87 for the pitted cherries at the other side thereof. The chute 86 is aligned with the opening 24 receiving the pits as they are removed by the punch blades 29 and the chute 87 is aligned with the opening 25 for receiving the pitted cherries as they are discharged by the plunger 31. Associated with these chutes is provided suitable receptacles such as a pair of bowls, pans or the like 88 for separately receiving the pits and pitted cherries.

The actuator shaft 46 may be driven or rotated in a clockwise direction by the manual operation of the crank arm 47 and crank handle 48, or by a suitable power drive as explained above. To enable the pitter to be power operated, the cylindrical flange 89 of the annular member 53 is preferably provided with an internal thread 91 adapted to receive the mount (not shown) of a motor upon the removal of the crank arm. Upon such removal, the motor mount may then be screwed into the thread 91 and a coupling on the motor shaft will automatically align with keyways 92 on the end of the actuator shaft 46. Thus it is possible to operate several household devices with one and the same motor.

The actuator shaft is journalled at its inner end in a bearing 93 formed in the wall 18 of the inner casing 16. The combined Geneva gear 57, pinion 58 and connecting hub or sleeve 59 are shown as rotatably mounted in a bearing 94 formed on the base plate 19 of the inner casing 16.

In operating the assembled device, the operator introduces cherries into the hopper with one hand and rotates the handle 48 and crank arm 47 in a clockwise direction with the other hand. Such rotation in turn rotates the actuator shaft 46 and actuator sleeve 54 pinned thereto. Rotation of the actuator sleeve carries along the disc 55 and its Geneva drive pin 56, and the eccentric 71 and its projecting pin 72 for actuating the punch holder 32 by engaging and depressing the latter against the compression of the spring 45 once during each revolution of the actuator shaft 46. Such downward movement of the punch holder depresses the punch blades 29 to pit a cherry in a recess 22, and simultaneously depresses the plunger 31 adjacent to the blades and thereby causing the cherry in the adjacent recess 22 that was previously pitted to be ejected or discharged.

To intermittently move the conveyor disc and cause it to deliver cherries in the recesses 22 to the punch blades 29 and then to the plunger 31, the Geneva drive pin 56 engages in successive radial slots 60 in the actuating or drive face of the Geneva gear 57. As there are eight recesses 22 equally spaced apart in the conveyor disc or dial 21, the latter is rotated intermittently and progressively in a counter-clockwise direction through an arc of 45°.

From the above description and the disclosure in the drawings, it will be readily apparent that the invention comprehends a unique cherry pitter having a novel construction and assembly and including a drive or actuating mechanism that is simple and positive in operation.

Having thus disclosed the invention, I claim:

An apparatus for pitting cherries comprising, a principal housing member defining a cherry storage and supplying hopper and a conveyor supporting base, said base having a bottom wall in which are formed cherry pit and pitted cherry discharge openings as well as a conveyor drive shaft journal opening, a rotary disc conveyor seated in said base having a circular alignment of holes for receiving individual cherries from said hopper, a secondary housing member vertically slidable into for nesting within said principal housing member containing a cherry pitting punch and a cherry discharging plunger supported in vertical parallel alignment over said discharge openings in said base, spring means for yieldably maintaining said punch and plunger poised over said discharge openings, a horizontal drive shaft rotatably carried by said secondary housing member including a Geneva driving disc and a crank pin disc for engaging and depressing said punch and plunger, a Geneva driven disc including integrally associated meshing gear engagement with said conveyor drive shaft whereby to impart intermittent advancing movement to said conveyor so as to progressively align its spaced holes beneath said punch and plunger, and a locking bar having a keyhole opening to be saddled upon a portion of said conveyor shaft protruding through said base whereby said bar may be utilized in the instantaneous assembly or disassembly of said secondary housing member and its contained elements with respect to said principal housing member.

CLIFFORD E. IVES.

REFERENCES CITED

The following references are of record in the file of this patent:

UNITED STATES PATENTS

| Number | Name | Date |
|---|---|---|
| 102,021 | Marchant | Apr. 19, 1870 |
| 1,024,625 | Foote | Apr. 30, 1912 |
| 1,438,526 | Herbert | Dec. 12, 1922 |
| 1,996,957 | Fitzgerald | Apr. 9, 1935 |
| 2,360,103 | Britten | Oct. 10, 1944 |
| 2,388,814 | Ashlock | Nov. 13, 1945 |